(12) United States Patent
Cho

(10) Patent No.: US 7,830,279 B2
(45) Date of Patent: Nov. 9, 2010

(54) APPARATUS FOR INPUTTING CHARACTERS AND METHOD THEREOF

(75) Inventor: Sung Tae Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 974 days.

(21) Appl. No.: 11/651,567

(22) Filed: Jan. 10, 2007

(65) Prior Publication Data

US 2007/0205920 A1    Sep. 6, 2007

(30) Foreign Application Priority Data

Jan. 10, 2006    (KR) .................. 10-2006-0002851

(51) Int. Cl.
*H03M 11/00* (2006.01)
(52) U.S. Cl. .................. 341/23; 341/20; 341/22; 345/168; 345/160; 345/163; 345/167
(58) Field of Classification Search .................. 341/20, 341/22; 345/160, 163, 168, 167
See application file for complete search history.

(56) References Cited

U.S. PATENT DOCUMENTS 5,635,926 A * 6/1997 Li .................. 341/20
6,097,964 A * 8/2000 Nuovo et al. .................. 455/566
6,810,272 B2 * 10/2004 Kraft et al. .................. 455/566
6,965,782 B1 * 11/2005 Nuovo et al. .................. 455/550.1
7,012,201 B2 * 3/2006 Kodani et al. .................. 200/14

* cited by examiner

*Primary Examiner*—Albert K Wong
(74) *Attorney, Agent, or Firm*—Birch, Stewart, Kolasch & Birch, LLP

(57) ABSTRACT

An apparatus for inputting characters and method thereof are disclosed, by which a character can be inputted at high speed in a manner of implementing a new character set and by which a character can be inputted at high speed using a new character set and a rotatable moving key. The present invention includes an input unit comprising a plurality of roller type keys, each generating a rotation-associated keying signal or a pressing-associated keying signal and a plurality of selection keys, each generating the pressing-associated keying signal and a controller performing a character set search by a character set unit according to the rotation-associated keying signal, the controller performing a character input according to the pressing-associated keying signal.

32 Claims, 6 Drawing Sheets

APPARATUS FOR INPUTTING CHARACTERS AND METHOD THEREOF

This application claims the benefit of the Korean Patent Application No. 10-2006-0002851, filed on Jan. 10, 2006, which is hereby incorporated by reference as if fully set forth herein.

BACKGROUND OF THE INVENTION

1. Field of the Invention

The present invention relates to character input, and more particularly, to an apparatus for inputting characters and method thereof. Although the present invention is suitable for a wide scope of applications, it is particularly suitable for supporting a high-speed character input.

2. Discussion of the Related Art

Generally, a communication terminal has a key arrangement as shown in FIG. 1. And, a character set configuration according to the key arrangement shown in FIG. 1 is shown in FIG. 2.

FIG. 1 is a layout of a general key alignment used for a communication terminal, and FIG. 2 is a diagram of a general alphabet set configuration in a communication terminal.

Referring to FIG. 1, a communication terminal is provided with a keypad including a plurality of keys.

The keypad includes keys used in inputting characters such as Korean letters, English letters, numerals, special symbols and the like. By assigning Korean consonants and vowels, English alphabets, numerals, special symbols to the keys for the character input, a character input by a key input can be implemented.

Single-figure numbers are normally assigned to the keys for the numerals, respectively. And, the key having the corresponding numeral assigned thereto is named a numeral key.

And, alphabets and Korean consonants and vowels are assigned to the numeral key by a set unit as well as the corresponding numeral.

For instance, eight alphabet sets are assigned to the numeral keys in order, respectively in a manner that eight numerals 2 to 9, as shown in FIG. 2, are mapped to the numeral keys, respectively.

And, special symbols are assigned to the rest of the numeral keys, i.e., the numeral key-0 and the numeral key-1 except the former numeral keys to which the alphabet sets are assigned.

In case of attempting to input alphabets via the above-explained key structure, a user completes an input of a specific alphabet in a manner of selecting one of the numeral keys having the alphabet sets assigned thereto and then pressing the selected numeral key at least once.

The alphabet inputting process is explained for example as follows.

First of all, it is assumed that a user attempts to input a small alphabet letter 's'.

The user is able to input 's' by pressing the numeral key-7 four times.

Thus, in the related art, a specific key has to be pressed maximum four times to input a specific alphabet letter, which causes inconvenience to a user. This is because maximum four alphabet letters are mapped to one key of a related art communication terminal.

Moreover, since a specific alphabet letter is inputted by pressing a specific key at least once, an input error frequently takes place in the related art. For instance, since three alphabet letters are assigned to one key in most cases, a user accustomed to press a key up to three times. Yet, alphabet 's' or 'z' is a fourth element of an alphabet set including four alphabets. So, a user, who is accustomed to pressing a key three times, may input a third element 'r' or 'y' of the alphabet set instead of inputting 's' or 'z'.

SUMMARY OF THE INVENTION

Accordingly, the present invention is directed to an apparatus for inputting characters and method thereof that substantially obviate one or more problems due to limitations and disadvantages of the related art.

An object of the present invention is to provide an apparatus for inputting characters and method thereof, by which a character can be inputted at high speed in a manner of implementing a new character set.

Another object of the present invention is to provide an apparatus for inputting characters and method thereof, by which a character can be inputted at high speed using a new character set and a rotatable moving key.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for inputting characters according to the present invention includes an input unit comprising a plurality of roller type keys, each generating a rotation-associated keying signal or a pressing-associated keying signal and a plurality of selection keys, each generating the pressing-associated keying signal and a controller performing a character set search by a character set unit according to the rotation-associated keying signal, the controller performing a character input according to the pressing-associated keying signal.

Preferably, the input unit further includes a belt enclosing outer circumferences of a plurality of the roller type keys to enable a plurality of the roller type keys to be rotated.

Preferably, each of a plurality of the roller type keys includes a fixed end configured to be fixed to a lower side in case that an external force is applied to the corresponding roller type key in a vertical direction, a free end configured to move downward in case that the external force is applied, and a contact portion configured to come into contact with the free end having moved downward.

More preferably, if the free end and the contact portion come into contact with each other, the key having received the external force in the vertical direction generates the pressing-associated keying signal.

Preferably, the input unit further includes a sensor configured to detect rotations of a plurality of the roller type keys.

More preferably, if sensing the rotations of the corresponding key, the sensor generates the rotation-associated keying signal.

Preferably, the input unit further includes a rotation holding part configured to apply a periodic interruption to rotations of a plurality of the roller type keys.

Preferably, the controller is provided with a memory to store a plurality of character sets each of which includes a plurality of minimum unit characters for the character set search.

More preferably, after the search by the character set unit according to the rotation-associated keying signal, the controller executes the character input in a manner of selecting at least one of the characters of the searched character set according to the pressing-associated keying signal.

Preferably, the keys generating the pressing-associated keying signals among the roller type keys and the selection keys are configured in a manner of taking one of the keys as a center key and arranging the rest of the keys centering on the center key in left, right, upper and lower positions, respectively.

More preferably, arrangement positions of the keys generating the pressing-associated keying signals are mapped to arrangement of minimum unit characters configuring a character set.

In another aspect of the present invention, a apparatus for inputting characters includes a moving key having a roller shape for rotation to operate as a button type key, a plurality of selection keys arranged in at least one position centering on the moving key, and a controller searching a plurality of character sets including a plurality of minimum unit characters for at least one character set if a signal according to the rotation of the moving key is inputted, the controller arranging the minimum unit characters belonging to the searched character set to map to positions of the moving key and the selection keys, respectively, the controller, if the moving key or one of the selection keys is pressed, recognizing the minimum unit character mapped to the pressed key as an input character.

Preferably, the apparatus further includes a display unit displaying the searched character set and the recognized input character.

More preferably, the display unit displays the minimum unit characters belonging to the searched character set in a manner of arranging the minimum unit characters belonging to the searched character set to map to positions of the moving key and the selection keys, respectively, In this case, a plurality of the selection keys include a left key arranged to a left side centering on the moving key, a right key arranged to a right side centering on the moving key, an upper key arranged to an upper side centering on the moving key, and a lower key arranged to a lower side centering on the moving key. Moreover, the character of a middle-coming sequence among the minimum unit characters belonging to each of the character sets is mapped to the moving key, the character of a first-coming sequence among the minimum unit characters belonging to each of the character sets is mapped to the left key, the character of a last-coming sequence among the minimum unit characters belonging to each of the character sets is mapped to the right key, the character of a sequence right ahead of the middle-coming sequence is mapped to the upper key, and the character of a sequence right behind the middle-coming sequence is mapped to the lower key.

Preferably, a plurality of the selections keys are connected to the moving key in part.

More preferably, the key connected to the moving key among the selection keys is configured to operate as the button type key with the roller shape.

More preferably, the keys connected to the moving key among the selection keys include a left key arranged in a left side of the moving key and a right key arranged in a right side of the moving key.

More preferably, the keys connected to the moving key among the selection keys include an upper key arranged in an upper side of the moving key and a lower key arranged in a lower side of the moving key.

More preferably, the apparatus further includes a belt configured to enclose outer circumferences of the keys connected to the moving key to enable the moving key and the keys connected to the moving key to rotate.

Preferably, the moving key is configured to rotate in one of left, right, upper and lower positions.

Preferably, the apparatus further includes a rotation holding part provided to the roller shape with a predetermined interval each to apply a periodic interruption to the rotation of the moving key.

Preferably, the character set includes an alphabet set including alphabets as the minimum unit characters.

In another aspect of the present invention, an apparatus for inputting characters includes a moving key having a roller shape for rotation, the moving key including a plurality of roller keys operating as button type keys to select minimum unit characters and a belt enclosing outer circumferences of a plurality of the roller keys to enable a plurality of the roller keys to rotate, at least one or more button type keys operating to select the minimum unit characters together with the roller keys in part, and a control means for searching a plurality of character sets including the minimum unit characters, for one character set according to the rotation of the moving key, the control means for arranging the minimum unit characters belonging to the searched character set to map to positions of the roller keys and the button type keys, respectively, the control means for, if one of the roller keys and the button type keys is pressed, recognizing the minimum unit character mapped to the pressed key as an input character.

In another aspect of the present invention, a method of inputting characters includes the steps of configuring a plurality of character sets including minimum unit characters, performing a character set unit search to select at least one from a plurality of the character sets, arranging the minimum unit characters belonging to the character set selected by the character set unit search in a manner of mapping the corresponding minimum unit characters to positions of keys provided for inputting the characters, and if a selection for the minimum unit character mapped to one of the keys from the arranged minimum unit characters is recognized, executing an input of the selected minimum unit character.

Preferably, the character set unit search is executed according to rotations of roller type keys in part among the keys.

More preferably, if the rotations of the roller type keys in part are terminated, one character set is selected from a plurality of the character sets.

Preferably, if one of the keys is pressed, it is recognized that the minimum unit character mapped to the pressed key is selected.

Preferably, the keys include a first key, a left key arranged to a left side centering on the first key, a right key arranged to a right side centering on the first key, an upper key arranged to an upper side centering on the first key, and a lower key arranged to a lower side centering on the first key. Moreover, the character of a middle-coming sequence among the minimum unit characters belonging to the character set selected by the search is mapped to the first key, the character of a first-coming sequence among the minimum unit characters belonging to the selected character set is mapped to the left key, the character of a last-coming sequence among the minimum unit characters belonging to the selected character set is mapped to the right key, the character of a sequence right ahead of the middle-coming sequence is mapped to the upper key, and the character of a sequence right behind the middle-coming sequence is mapped to the lower key.

Preferably, the method further includes the step of displaying the character set selected by the search.

Preferably, the method further includes the step of displaying the minimum unit characters belonging to the character set selected by the search in a manner of arranging the minimum unit characters belonging to the character set selected by the search to map to position of arranging the keys, respectively.

Preferably, the character set is an alphabet set including alphabets as the minimum unit characters.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a configuration of a character inputting apparatus according to the present invention is preferably implemented within a terminal, and more particularly, within a communication terminal.

In the present invention, character sets are configured to include a plurality of minimum unit characters for various kinds of languages (e.g., Korean, English, etc.). And, some of the character sets include non-language such as numerals, special symbols and the like.

In the following description, the present invention configures to use new character sets (hereinafter called alphabet sets) for English (alphabet).

And, the present invention proposes a configuration and operation for inputting alphabets using alphabet sets.

Yet, an implementation range of the present invention is not limited to the configuration and operation using the alphabet sets for English (alphabet).

Figure 1:
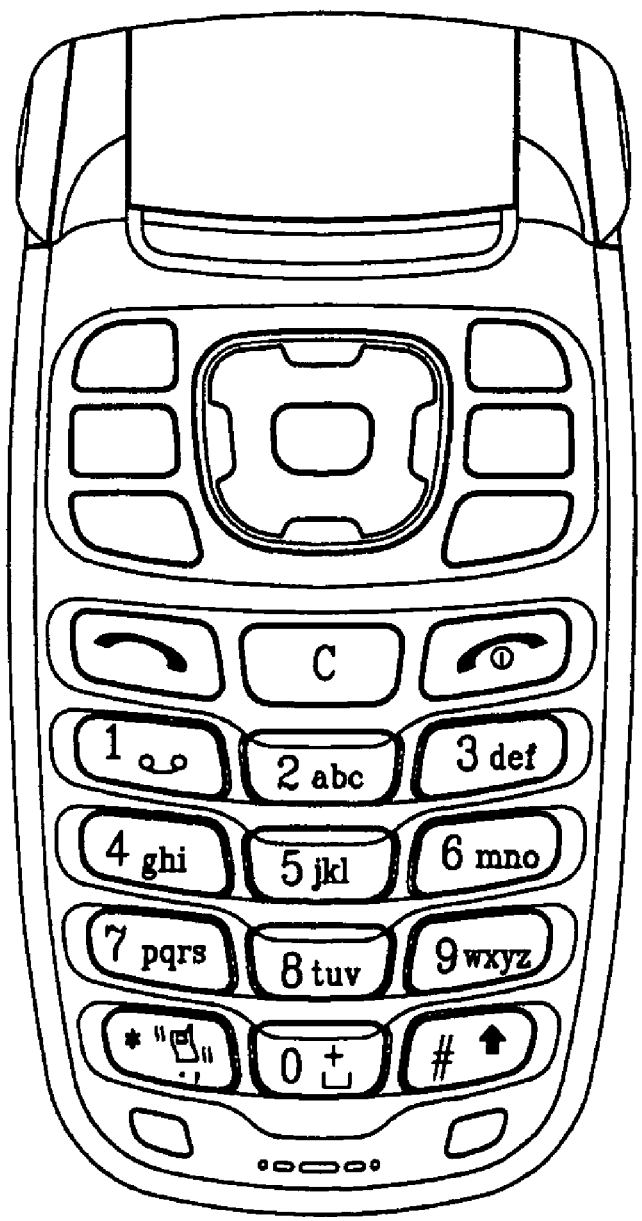
FIG. 1 is a layout of a general key arrangement used for a communication terminal.
Figure 2:
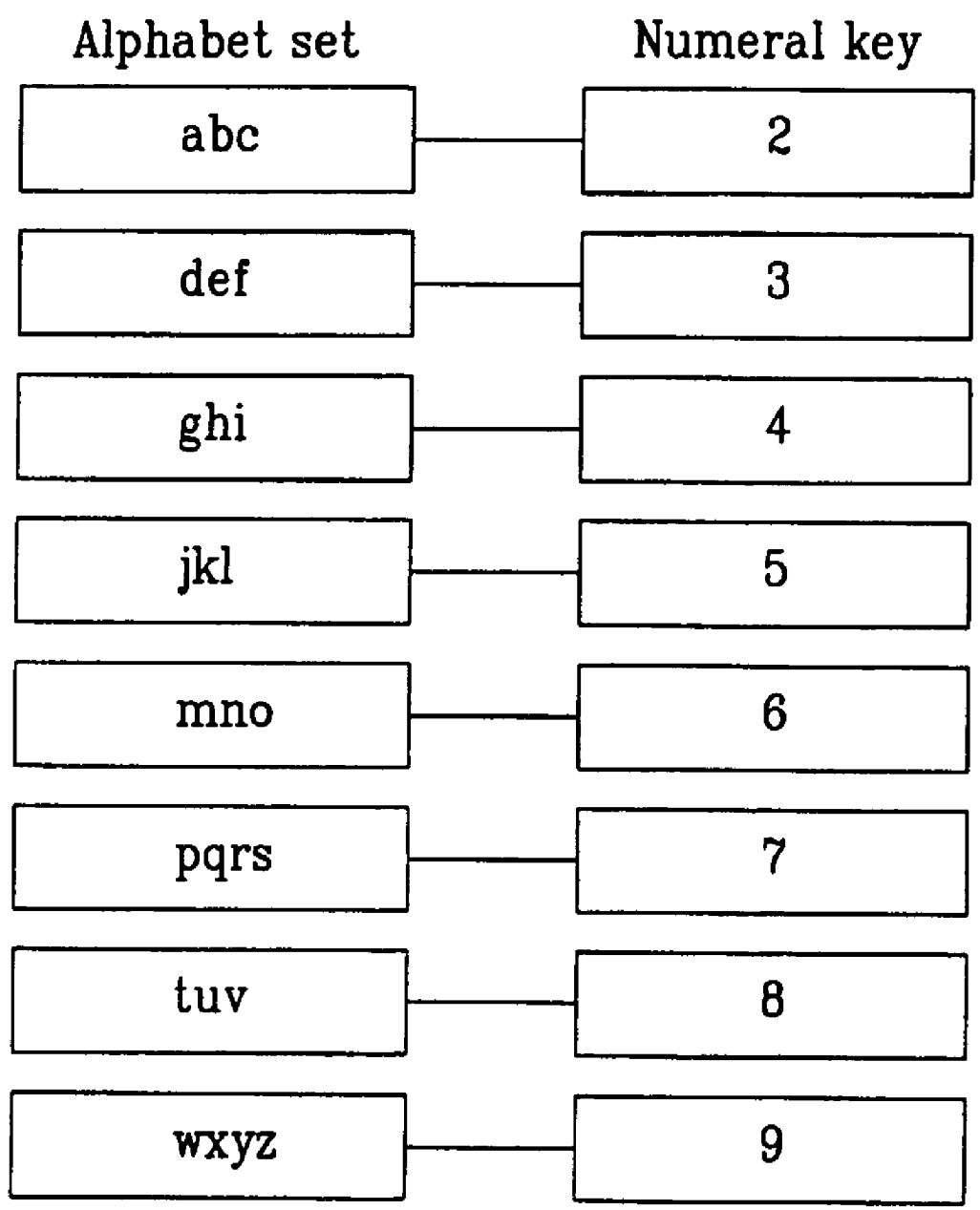
FIG. 2 is a diagram of a general alphabet set configuration in a communication terminal.
Figure 3:
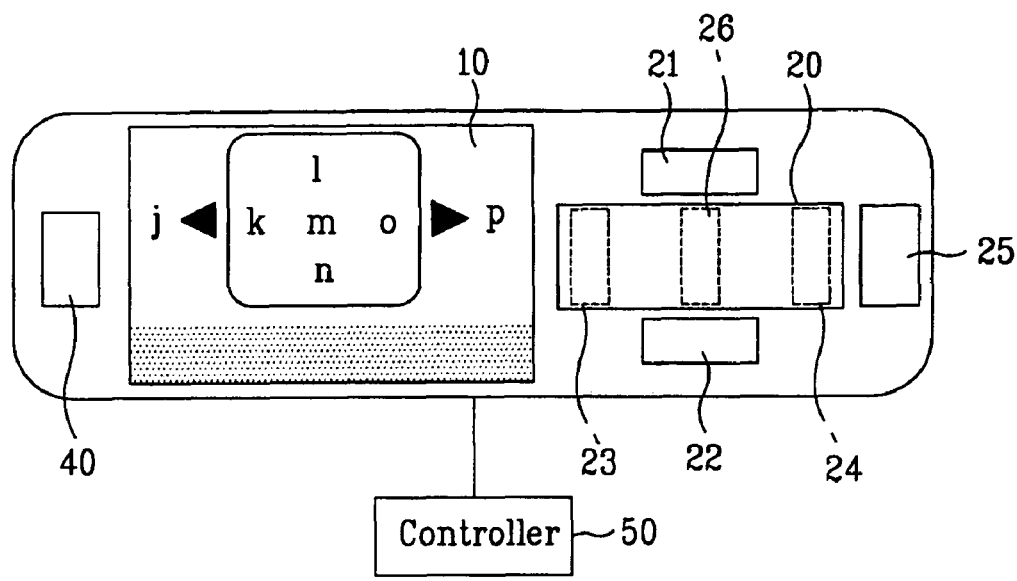
FIG. 3 is a block diagram of an apparatus for inputting characters according to one embodiment of the present invention.

FIG. 3 is a block diagram of an apparatus for inputting characters according to one embodiment of the present invention.

Referring to FIG. 3, an apparatus according to the present invention includes a controller 50, a display unit 10 and an input unit 20 to 26 and 40.

The display unit 10 displays characters by a set unit according to a control of the controller 50.

The display unit 10 displays a process for combining minimum unit characters selected through the input unit 20 to 26 and 40 by the controller 50 and a result (e.g., complete word or sentence) of the combining process.

The input unit 20 to 26 and 40 is manipulated by a user to input characters.

Figure 8:
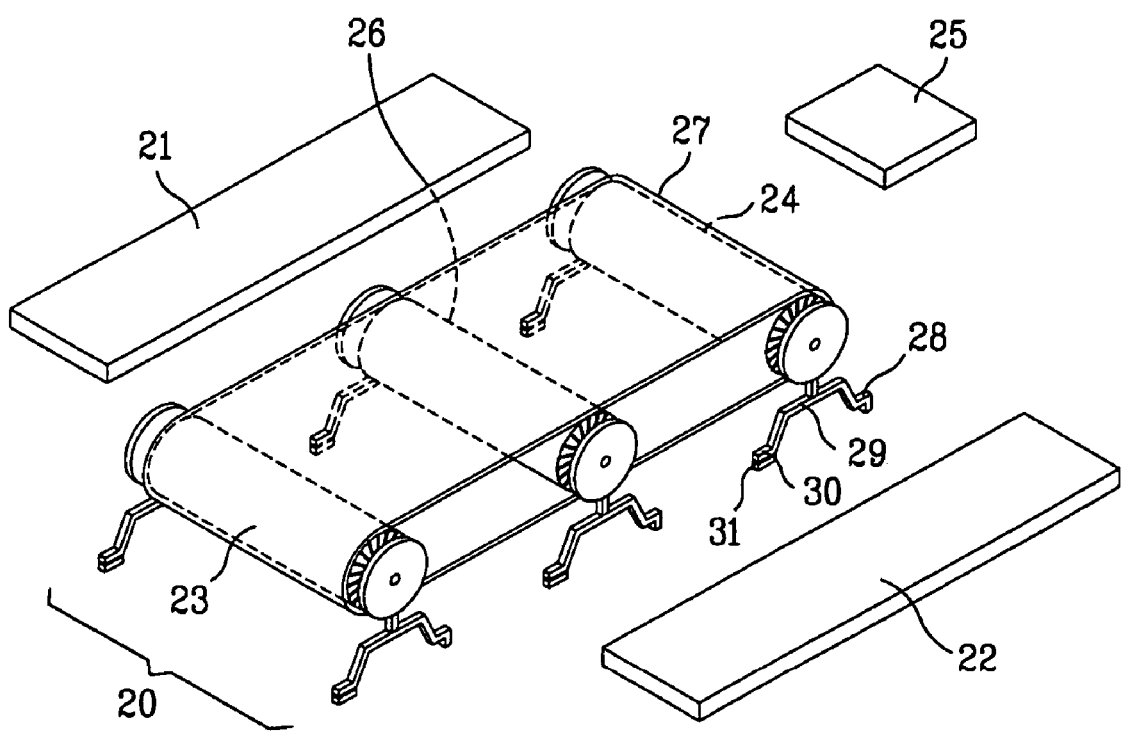
FIG. 8 is an exploded perspective diagram of a key configuration for inputting characters according to one embodiment of the present invention.

The input unit 20 to 26 and 40 includes a plurality of keys. In the present invention, a plurality of keys configuring the input unit 20 to 26 and 40 include a moving key 20 and button keys 21, 22, 25 and 40. A detailed configuration of the input unit 20 to 26 and 40 according to one embodiment of the present invention is shown in FIG. 8.

The moving key 20 is directly connected with three keys 23, 24 and 26.

And, the rest of the button keys 21, 22, 25 and 40 interoperate with the moving 20 to input characters.

The moving key 20 includes three roller type keys 23, 24 and 26 to be directly connected with the moving key, a belt 27 enclosing the three keys 23, 24 and 26, and parts 28 to 31 enabling the roller type keys 23, 24 and 26 to operate as button type keys.

Each of the three keys 23, 24 and 26 directly connected with the moving key 20 is configured to have a roller shape for rotation and operate as a button type key.

The three keys 23, 24 and 26 directly connected with the moving key 20 are named a first roller key 23, a second roller key 24 and a third roller key 26, respectively.

The first to third roller keys 23, 24 and 26 support a data input through rotational and pressing actions. In particular, the rotational and pressing actions of the first to third roller keys 23, 24 and 26 correspond to keying actions. So, the first to third roller keys 23, 24 and 26 are rotated or pressed to generate a keying signal.

In case that the moving key 20 is arranged in a horizontal direction, the first to third roller keys 23, 24 and 26 are configured to rotate in right and left directions. In case that the moving key 20 is arranged in a vertical direction, the first to third roller keys 23, 24 and 26 are configured to rotate in upper and lower directions.

The belt 27 is connected with outer circumferences of the first to third roller keys 23, 24 and 26. In particular, the belt 27 is connected to rotate together with the first to third roller keys 23, 24 and 26.

The belt 27, as shown in FIG. 8, is configured to simultaneously enclose the outer circumferences of the first to third roller keys 23, 24 and 26 and perform endless track movement.

The first to third roller keys 23, 24 and 26 support to select one from a plurality of character sets according to their rotational motions. Namely, the first to third roller keys 23, 24 and 26 support a search by character set unit according to rotational motions.

For instance, if a rotational direction of the first to third roller keys 23, 24 and 26 is right, the moving key 20 outputs a signal for a forward search for character sets to the controller 50. If so, the controller 50 turns over and displays the character sets in a forward direction.

On the other hand, if a rotational direction of the first to third roller keys 23, 24 and 26 is left, the moving key 20 outputs a signal for a backward search for character sets to the controller 50. If so, the controller 50 turns over and displays the character sets in a backward direction.

Moreover, the first to third roller keys 23, 24 and 26 are switched if an external force is applied (pressed) in a vertical direction. And, the first to third roller keys 23, 24 and 26 support to select a minimum unit character (alphabet) from the search-completed character set according to a corresponding switching.

The button type keys 21 and 22 support to select a minimum unit character (alphabet) from a character set. So, by the character selection, a corresponding character is inputted.

The button type keys 21, 22, 25 and 40 operated by being indirectly associated with the moving key 20 include an upper key 21, a lower key 22, a cancel key 25 and a shift key 40.

The upper and lower keys 21 and 22 are provided to select one minimum unit character (alphabet) from the search-completed character set for the rotational motion of the moving key together with the first to third roller keys 23, 24 and 26. So, if an external force is applied (pressed) in a vertical direction, the upper key 21 or the lower key 22 is selected.

Thus, the input unit 20 to 26 and 40 of the present invention configures a 5-positional configuration (left, right, upper, lower and middle keys) with the first to third roller keys 23, 24 and 26, the upper key 21 and the lower key 22. The third roller key 26 is the key arranged in the middle, the first and second roller keys 23 and 24 are the keys arranged in left-right positions, and the upper and lower keys 21 and 22 are the keys arranged in upper-lower positions.

If a minimum unit character is selected via the 5-positional keys 21, 22, 23, 24 and 26, an input of the character is completed.

The cancel key 25 is to cancel the input of one minimum unit character (alphabet) of which input has been completed by the selection from the character set.

The shift key 40 is to change a mode for an input of a capital letter into a mode for an input of a small letter in case of English, and vice versa.

For instance, the shift key 40 has the same function of a shift key applied to a keyboard.

A configuration and operation of the moving key 20 for a character set unit search are explained in detail as follows.

The moving key 20 includes a detecting sensor (not shown in the drawing) detecting rotational motions of the roller keys 23, 24 and 26 according to a rotation of the belt 27 and a rotation holding part (not shown in the drawing) applying a periodic interruption to rotations of the first to third roller keys 23, 24 and 26.

The detecting sensor includes a light-emitting device and a light-receiving device opposing the light-emitting device. The detecting sensor detects a rotational motion according to whether a light emitted by the light-emitting device converges into the light-receiving device. The sensor detecting the rotational motion can be implemented in various ways and is not limited to the above-explained example. The detecting sensor also can be any kind of motion sensors including mechanical, electrical and magneto sensors.

The rotation holding part is provided to the first to third roller keys 23, 24 and 26 with a predetermined interval each. So, the first to third roller keys 23, 24 and 26 make rotational motions held for each periodic interval instead of making continuous rotational motions.

Hence, the first to third roller keys 23, 24 and 26 stay on one of a plurality of steps each of which corresponds to one held point where one rotation is completed.

A rotation of the moving key 20 by the belt 27 and the first to third roller keys 23, 24 and 26 follows circulations on the same orbit repeatedly. So, the moving key 20 supports a repetitive circulation search of a character set unit.

A detection signal according to the rotations of the first to third roller keys 23, 24 and 26 is transferred to the controller 50.

The controller 50 searches character sets to correspond to a rotational degree of the first to third roller keys 23, 24 and 26 and then displays the character set corresponding to the search result on the display unit 10.

Subsequently, one of the upper key 21, the lower key 22 and the first to third roller keys 23, 24 and 26 configuring the 5-positional key configuration is pressed in a vertical direction by an external force, a switching signal is generated to be transferred to the controller 50.

The controller 50 further displays a minimum unit character (alphabet), which is mapped to a position of the pressed key in the character set currently displayed on the display unit 10.

In the above explanation, the switching for enabling the first to third roller keys 23, 24 and 26 to operate as button type keys is realized by the configuration shown in FIG. 8.

Since configurations of the first to third roller keys 23, 24 and 26 are equal to each other, the second roller key 24 is explained in the following description.

First of all, the moving key 20 includes a fixed end 28, an elastic support portion 29, a free end 30 and a contact portion 31 under the second roller key 24.

In a lower structure of the second roller key 24, the fixed end 28 is fixed and the free end 28 is configured to be spaced apart from the contact portion 31.

If an external force is applied to the second roller key 24 in a vertical direction, since the fixed end 28 is fixed, the free end 30 is moved downward only by being supported by the elastic support portion 29.

The free end 30 having moved downward comes into contact with the contact portion 31. By the contact, a switching signal is generated. The generated switching signal is then transferred to the controller 50.

The controller 50 receives the switching signal, recognizes a selection for a minimum unit character, and then executes an input of a corresponding character.

In the present invention, at least one character set (e.g., alphabet set) including a plurality of alphabets among twenty-six alphabets is configured.

For instance, alphabet sets, each of which includes five alphabets, are configured. And, the last alphabet 'z[Z]' configures one alphabet set together with symbols such as a period, a comma, a question mark and the like.

Preferably, the controller 50 is provided with a memory to store a plurality of the above-configured alphabet sets.

Figure 4A:
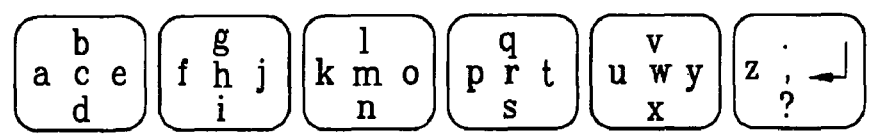
FIG. 4A is a diagram of character sets for inputting characters according to one embodiment of the present invention.

FIG. 4A is a diagram of character sets for inputting characters according to one embodiment of the present invention where alphabet set configurations are shown.

The controller 50 searches various alphabet sets shown in FIG. 4A through rotational manipulations of the aforesaid moving key 20.

The controller 50 displays one alphabet set searched by the rotation of the moving key 20 on the display unit 10.

In particular, if a detection signal according to the rotation of the moving key 20 is inputted, the controller 50 displays an alphabet set corresponding to a rotational degree of the moving key 20 on the display unit 10. FIG. 3 shows a case that a third alphabet set (configured with 'k~o') among the alphabet sets shown in FIG. 4A is displayed on the display unit 10.

The alphabet sets shown in FIG. 4A are arranged in a prescribed sequence.

Figure 4B:
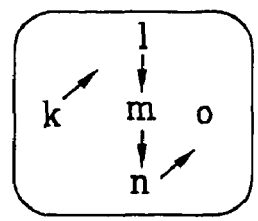
FIG. 4B is a diagram of a character arrangement sequence to configure a character set.

FIG. 4B is a diagram of a character arrangement sequence to configure a character set.

One alphabet set is configured with five alphabets. In an arrangement sequence of the alphabet set, alphabets are arranged with a position combination of a left-to-right position and an upper-to-lower position.

In particular, a sequence of alphabets belonging to the third alphabet set is 'k→l→m→n→o'.

In the character arrangement sequence of the third alphabet set, a middle-coming 'm' is placed at a center. A first-coming 'k' is placed left to the 'm' placed at the center. A last-coming 'o' is placed right to the 'm'. 'l' right ahead of the 'm' is placed upper to the 'm' placed at the center. And, 'n' right behind the 'm' is placed lower to the 'm'.

The character arrangement configuration in the alphabet set is mapped by the configuration of the 5-direction keys 21, 22, 23, 24 and 26 for selecting a minimum unit character.

So, the first roller key 23 is the key to select a character having a first-coming sequence from a character set currently displayed via the display unit 10.

The first roller key 24 is the key to select a character having a last-coming sequence from a character set currently displayed via the display unit 10.

The third roller key 26 is the key to select a character having a middle-coming sequence from a character set currently displayed via the display unit 10.

The upper key 21 is the key to select a character having a sequence right ahead of the middle-coming sequence from a character set currently displayed via the display unit 10.

And, the lower key 22 is the key to select a character having a sequence right before the middle-coming sequence from a character set currently displayed via the display unit 10.

In the following description, a process for searching character sets by the repetitive circulation search of the moving moving key 20 is explained. In the present invention, an index for designating a unique sequence is assigned to each character set to facilitate a character set search.

For instance, in case that there are five character sets to which index-1 to index-5 are assigned, respectively, the moving key 20 is rotated by five steps in a left-to-right direction while the character set of the index-1 is displayed. Of course, this rotation is done by an external force applied by a user.

If so, the controller 50 outputs the character sets of index-1 to index-5 through the display unit 10 by sequentially turning over the character sets of index-1 to index-5. In this case, how long the turned-over character set will be displayed on the display unit 10 can vary according to a rotational speed of the moving key 20. For instance, if the rotational speed of the moving key 20 is higher than a predetermined reference speed, the turned-over character sets (character sets of the index-2 to the index-5) are omitted to be exposed on the display unit 10 but a final character set after completion of the rotation is outputted via the display unit 10 only.

Since the rotation has proceeded in a right direction by five steps in the above case, the controller 50 outputs the character set of the index-1 via the display unit 10 after completion of the rotation.

Figure 5:
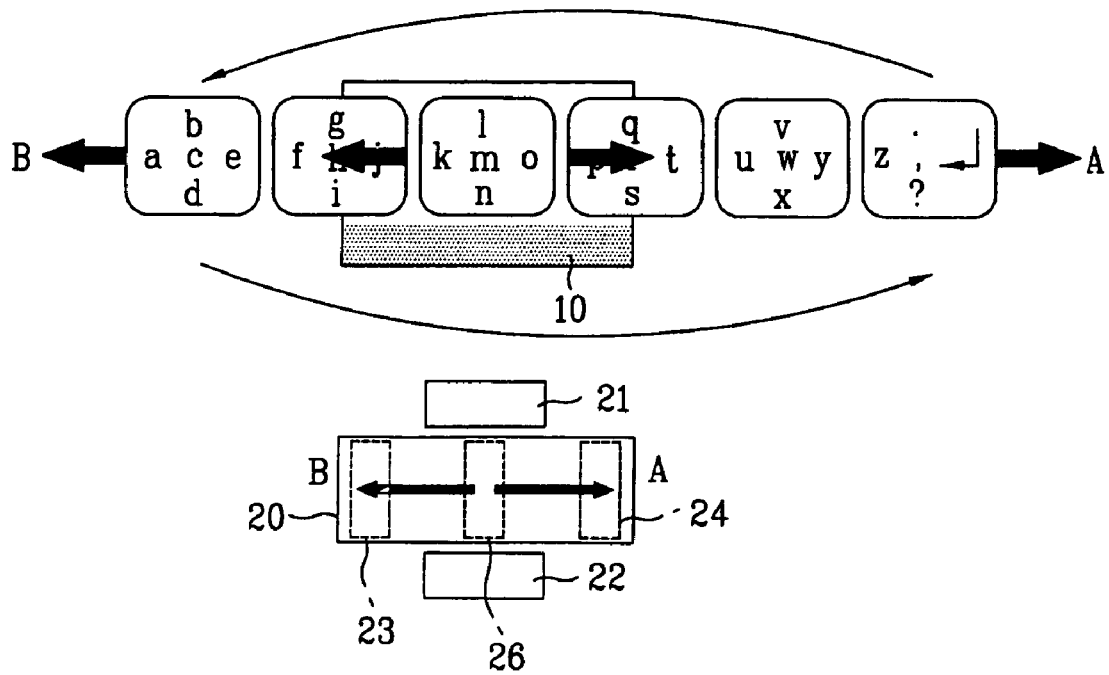
FIG. 5 is a diagram to explain a search control procedure for inputting characters according to one embodiment of the present invention.

FIG. 5 is a diagram to explain a search control procedure for inputting characters according to one embodiment of the present invention.

Referring to FIG. 5, if the moving key 20 is rotated in a right direction (A), the controller 50 searches character sets in a forward direction (index-increasing direction).

On the other hand, if the moving key 20 is rotated in a left direction (B), the controller 50 searches character sets in a backward direction (index-decreasing direction).

For instance, if the moving key 20 is rotated by one step in a right direction while a first alphabet set including 'a~e' is displayed, the controller 50 displays a second alphabet set including 'f~j'.

If the moving key 20 is farther rotated by one step in the right direction, the controller 50 displays a third alphabet set including 'k~o'.

Meanwhile, in case of displaying one alphabet set on the display unit 10, an alphabet of a last-coming sequence in a previous alphabet set and an alphabet of a first-coming sequence in a next alphabet set are displayed together.

For instance, if an alphabet set including 'k~o', as shown in FIG. 3, is a currently searched set, alphabet 'j' of a last-coming sequence in a previous alphabet set including 'f~j' is displayed together with an alphabet set including 'k~o' and alphabet 'p' of a first-coming sequence in a next alphabet set including 'p~t' is also displayed together with the alphabet set including 'k~o'.

For additional example, in the above description, one searched character set is displayed only or one searched character set is displayed together with some characters of a neighbor character set.

If the above two case are extended, one searched character set and another character set are simultaneously displayed on the display unit 10.

In particular, one searched character set and a character set corresponding to a sequence right behind that of the searched character set are simultaneously displayed.

One searched character set and a character set corresponding to a sequence right next to that of the searched character set are simultaneously displayed.

And, three character sets including one searched character set, a character set corresponding to a sequence right behind that of the searched character set and a character set corresponding to a sequence right next to that of the searched character set are simultaneously displayed.

For theses extension examples, the apparatus of the present invention further includes a key to select whether to display a plurality of character sets or the searched character set only on the display unit 10. In case of a mode for displaying one searched character set only, if the selection key for supporting the simultaneous display of the character sets is pressed, the controller 50 further displays another character set on the display unit 10 together with the searched character set.

For instance, if a first alphabet set including 'a~e' is searched, the controller 50 preferentially displays the first alphabet set including 'a~e' on the display unit 10. If the selection key for the simultaneous display of character set is pressed, the controller 50 displays a second alphabet set including 'f~j', which is a set of a next step, on the display unit 10 together with the first alphabet set including 'a~e'.

According to the way of implementation, it is able to display an alphabet set behind one step together with the first alphabet set including 'a~e'.

It is also able to consider a case that at least two alphabet sets are simultaneously displayed together with the first alphabet set including 'a~e'. In particular, it is also possible to display an alphabet set behind one step and an alphabet set ahead of one step together with the first alphabet set including 'a~e'.

Figure 6:
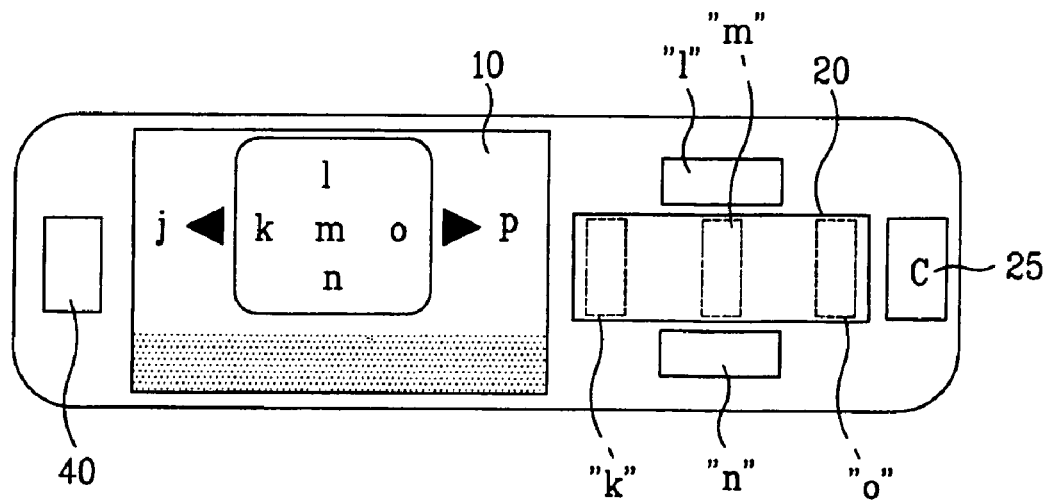
FIG. 6 is a diagram to explain a character input control procedure after a character search according to one embodiment of the present invention.

FIG. 6 is a diagram to explain a character input control procedure after a character search according to one embodiment of the present invention.

As mentioned in the foregoing description, a configuration of minimum unit characters (alphabets) constructing a character ser is mapped to positions of arranging a plurality of the keys 21, 22, 23, 24 and 26.

In FIG. 6, an alphabet set including 'k~o' is searched by a rotational motion of the moving key 20.

The first roller key 23 is the key to input a character of a first-coming sequence, i.e., alphabet 'k' in a current character set.

The upper key 21 is the key to input a character of a sequence right ahead of a middle-coming sequence, i.e., alphabet 'l'.

The third roller key 26 is the key to input a character of a middle-coming sequence in a current character set, i.e., alphabet 'm'.

The lower key 22 is the key to input a character of a sequence right behind the middle-coming sequence, alphabet 'n'.

And, the second roller key 24 is the key to input a character of a last-coming sequence in the current character set, i.e., alphabet 'o'.

If one of the five keys 21, 22, 23, 24 and 26 respectively mapped to the minimum unit characters of the character set is pressed, the controller 50 recognizes an alphabet mapped to the pressed key as an input character. The controller 50 then displays the input character on an English input part. In this case, the English input part is a portion of the display unit 10. Since letter combination is not required for the English input, alphabets are enumerated according to input sequences.

For another instance, the controller 50 preferentially checks whether a current input character inputted by a key pressing is combined with a previously inputted character. If the two input characters are combined together, the controller 50 displays a result of the combination of the two characters. This is applicable to Korean.

Figure 7:
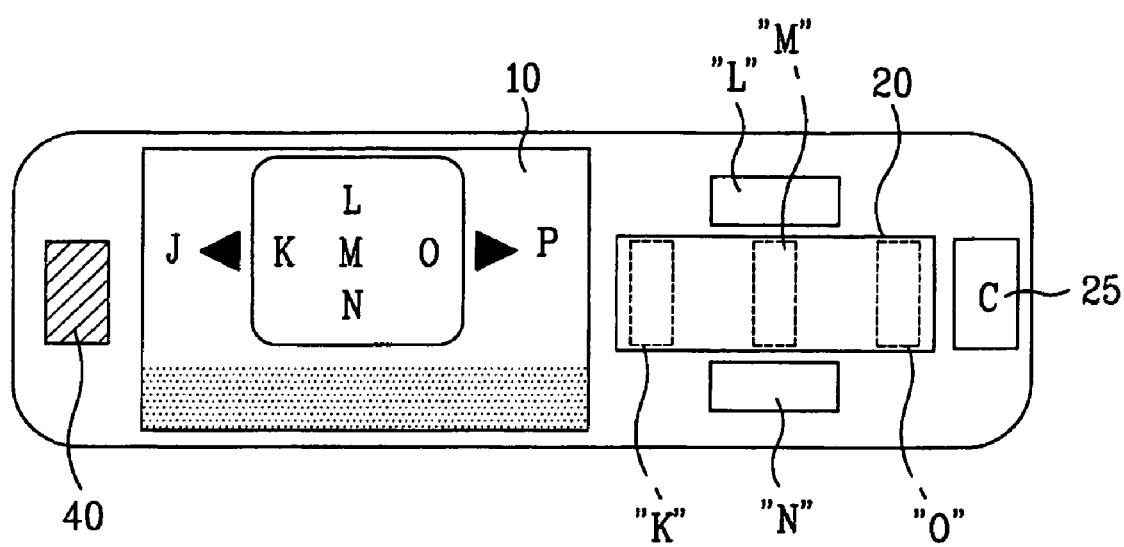
FIG. 7 is a diagram to explain a capital letter input control procedure according to another embodiment of the present invention.

FIG. 7 is a diagram to explain a capital letter input control procedure according to another embodiment of the present invention, in which the shift key 40 is used for inputting capital letters.

Referring to FIG. 7, after an alphabet set including 'k~o' has been searched through a rotational motion of the moving key 20, the shift key 40 is pressed.

If so, the controller 50 converts the currently searched alphabet set to capital letters. The controller 50 further displays an alphabet set of the converted capital letters on the display unit 10. In this case, a configuration of the displayed capital letters of the alphabet set is mapped to the following positions of arranging a plurality of the keys 21, 22, 23, 24 and 26.

The first roller key 23 is the key to input a character of a first-coming sequence, i.e., alphabet 'K' in a current character set.

The upper key 21 is the key to input a character of a sequence right ahead of a middle-coming sequence, i.e., alphabet 'L'.

The third roller key 26 is the key to input a character of a middle-coming sequence in a current character set, i.e., alphabet 'M'.

The lower key 22 is the key to input a character of a sequence right behind the middle-coming sequence, alphabet 'N'.

And, the second roller key 24 is the key to input a character of a last-coming sequence in the current character set, i.e., alphabet 'O'.

If one of the five keys 21, 22, 23, 24 and 26 respectively mapped to the minimum unit characters of the character set is pressed, the controller 50 recognizes a capital alphabet mapped to the pressed key as an input character. The controller 50 then displays the input character on an English input part. In this case, since letter combination is not required for the English input, alphabets (capital letters) are enumerated according to input sequences.

The cancel key 25 is to cancel an input for an alphabet displayed on the English input part after completion of the input. If the cancel key 25 is pressed, the controller 25 deletes the corresponding alphabet.

In the present invention, an implementation range of the operation is not limited to the case of configuring the aforesaid six character sets. Hence, the present invention is to configure a plurality of character sets each of which includes a plurality of alphabets and alphabet sequences depend on a predetermined rule.

Accordingly, the present invention provides the following effects or advantages.

First of all, the present invention is able to search character sets at high speed using a rotatable moving key.

Secondly, as 5-directional keys (left, right, upper, lower and center keys) are mapped to characters belonging to a searched character set, one of 5-directional keys is pressed to input a character. So, the present invention is able to settle the inconvenience in inputting one character (alphabet) by pressing a corresponding key several times (maximum four times), which reduces a character input time. Moreover, it is able to avoid the input error that frequently takes place in case of inputting one character 9 alphabet) by pressing one key several times.

In particular, since six alphabet sets are used for English input, a character search is facilitated more and faster than that in case of configuring eight alphabet sets.

Secondly, the present invention uses an efficient key configuration, thereby contributing to device scale-down and enhancing device portability.

Thirdly, the present invention is applicable to a small-size device (PDA, palmtop, etc.) impossible to load a keypad therein or a remote controller to control a main frame in a remote place, thereby enabling characters (alphabet) to be inputted to the small-size device or remote controller.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for inputting characters, comprising:
   at least one roller key, each roller key generating a first signal when rotated and a second signal when pressed;
   at least one selection key, each selection key generating the second signal; and
   a controller performing a character set search according to the first signal, the controller performing a character input according to the second signal.

2. The apparatus of claim 1, wherein the at least one roller key is a plurality of roller keys, and further comprising a belt enclosing outer circumferences of the plurality of roller keys to enable the plurality of roller keys to be rotated.

3. The apparatus of claim 1, wherein each roller key comprises:
   a fixed end configured to be fixed to a lower side of a casing;
   a free end configured to move downward when an external force is applied; and
   a contact portion configured to come into contact with the free end.

4. The apparatus of claim 3, wherein when the free end and the contact portion come into contact with each other, the roller key having received the external force generates the second signal.

5. The apparatus of claim 1, further comprising a sensor configured to detect rotation of the at least one roller key.

6. The apparatus of claim 5, wherein when sensing the rotation of a roller key, the sensor generates the first signal.

7. The apparatus of claim 1, further comprising a rotation holding part configured to apply a periodic interruption to rotations of the at least one roller key.

8. The apparatus of claim 1, wherein the controller is provided with a memory to store a plurality of character sets, each character set including a plurality of minimum unit characters.

9. The apparatus of claim 8, wherein after the character set search according to the first signal, the controller executes the character input by selecting at least one of the characters of the searched character set according to the second signal.

10. The apparatus of claim 1, wherein the at least one roller key and the at least one selection key are configured with a center key and left, right, upper and lower keys.

11. The apparatus of claim 10, wherein an arrangement of the roller keys and selection keys is mapped to an arrangement of minimum unit characters forming a character set.

12. An apparatus for inputting characters comprising:
a moving key having a roller shape for rotation and to operate as a button key;
at least one selection key arranged about the moving key; and
a controller searching a plurality of character sets, each character set including a plurality of minimum unit characters, a character set selected by the moving key operating as a roller key, the controller arranging the minimum unit characters belonging to the selected character set to map to positions of the moving key and the selection keys, the controller, if the moving key or one of the selection keys is pressed, recognizing the minimum unit character mapped to the pressed key as an input character.

13. The apparatus of claim 12, further comprising a display unit displaying the selected character set and the recognized input character.

14. The apparatus of claim 13, wherein the display unit displays the minimum unit characters belonging to the selected character set.

15. The apparatus of claim 14, wherein the at least one selection key comprises:
a left key located at a left side of the moving key;
a right key located at a right side of the moving key;
an upper key located at an upper side of the moving key; and
a lower key located at a lower side of the moving key,
wherein a character of a middle-coming sequence among the minimum unit characters belonging to each of the character sets is mapped to the moving key, the character of a first-coming sequence among the minimum unit characters belonging to each of the character sets is mapped to the left key, the character of a last-coming sequence among the minimum unit characters belonging to each of the character sets is mapped to the right key, wherein the character of a sequence right ahead of the middle-coming sequence is mapped to the upper key, and the character of a sequence right behind the middle-coming sequence is mapped to the lower key.

16. The apparatus of claim 12, wherein the at least one selection key is partially connected to the moving key.

17. The apparatus of claim 16, wherein the selection keys connected to the moving key operate as a button type key.

18. The apparatus of claim 16, wherein the keys connected to the moving key among the at least one selection key include a left key located at a left side of the moving key and a right key located at a right side of the moving key.

19. The apparatus of claim 16, wherein the keys connected to the moving key among the at least one selection key include an upper key located at an upper side of the moving key and a lower key located at a lower side of the moving key.

20. The apparatus of claim 16, further comprising a belt configured to enclose outer circumferences of keys connected to the moving key to enable the moving key to rotate.

21. The apparatus of claim 12, wherein the moving key is configured to rotate in one of a left, right, upper and lower direction.

22. The apparatus of claim 12, further comprising a rotation holding part provided to the roller shape with a predetermined interval to apply a periodic interruption to the rotation of the moving key.

23. The apparatus of claim 12, wherein the character set comprises an alphabet set including letters as the minimum unit characters.

24. An apparatus for inputting characters comprising:
a moving key having a roller shape for rotation, the moving key comprising:
a plurality of roller keys operating as a button key to select minimum unit characters; and
a belt enclosing outer circumferences of the plurality of roller keys to enable the plurality of roller keys to rotate;
at least one button key operating to select the minimum unit characters together with the plurality of roller keys; and
a control means for searching a plurality of character sets including the minimum unit characters, for one character set according to the rotation of the moving key, the control means arranging the minimum unit characters belonging to the searched character set to map to positions of the roller keys and the button keys, respectively, the control means recognizing the minimum unit character mapped to the pressed key as an input character if the at least one roller key and the button keys is pressed.

25. A method of inputting characters comprising:
configuring a plurality of character sets, each character set including minimum unit characters;
performing a character set unit search to select at least one character set from the plurality of character sets;
aligning the minimum unit characters belonging to the character set selected by the character set unit search to map to positions of keys provided for inputting the characters; and
if a selection for the minimum unit character mapped to one of the keys from the minimum unit characters is recognized, executing an input of the selected minimum unit character.

26. The method of claim 25, wherein the character set unit search is executed according to rotations of roller keys.

27. The method of claim 26, wherein if the rotations of the roller keys are terminated, one character set is selected from the plurality of character sets.

28. The method of claim 25, wherein if one of the keys is pressed, the minimum unit character mapped to the pressed key is selected.

29. The method of claim 25, wherein the keys comprise:
a first key;
a left key arranged to a left side of the first key;
a right key arranged to a right side of the first key;

an upper key arranged to an upper side of the first key; and a lower key arranged to a lower side of the first key, wherein the character of a middle-coming sequence among the minimum unit characters belonging to the character set selected by the search is mapped to the first key, wherein the character of a first-coming sequence among the minimum unit characters belonging to the selected character set is mapped to the left key, wherein the character of a last-coming sequence among the minimum unit characters belonging to the selected character set is mapped to the right key, wherein the character of a sequence right ahead of the middle-coming sequence is mapped to the upper key, and wherein the character of a sequence right behind the middle-coming sequence is mapped to the lower key.

30. The method of claim 25, further comprising the step of displaying the character set selected by the search.

31. The method of claim 25, further comprising the step of displaying the minimum unit characters belonging to the selected character set by arranging the minimum unit characters in the selected character set to map to position of the keys.

32. The method of claim 25, wherein the character set is an alphabet set including letters as the minimum unit characters.

* * * * *